United States Patent [19]
Beeswing

[11] 3,940,764
[45] Feb. 24, 1976

[54] PULSE PAIR RECOGNITION AND RELATIVE TIME OF ARRIVAL CIRCUIT

[75] Inventor: Dennis Edwin Beeswing, Romford, England

[73] Assignee: Elliott Brothers (London) Limited, London, England

[22] Filed: Mar. 5, 1975

[21] Appl. No.: 555,639

Related U.S. Application Data
[63] Continuation-in-part of Ser. No. 543,153, Jan. 22, 1975, abandoned, which is a continuation of Ser. No. 403,762, Oct. 5, 1973, abandoned.

[30] Foreign Application Priority Data
Oct. 5, 1972    United Kingdom............... 45920/72

[52] U.S. Cl. ........... 343/6.5 LC; 307/234; 328/110; 328/119
[51] Int. Cl.² ...................... G01S 9/56; H03K 5/20
[58] Field of Search ........... 307/234; 328/109, 110, 328/119; 343/6.5 LC, 6.8 LC

[56] References Cited
UNITED STATES PATENTS

| | | | |
|---|---|---|---|
| 3,051,928 | 8/1962 | Sullivan | 328/119 X |
| 3,412,381 | 11/1968 | Hirsch et al. | 328/119 X |
| 3,423,728 | 1/1969 | Wissel | 328/119 X |
| 3,473,130 | 10/1969 | Briggs | 328/109 |
| 3,551,823 | 12/1970 | Stevens | 328/110 X |
| 3,611,158 | 10/1971 | Strathman | 307/234 X |
| 3,667,054 | 5/1972 | Nelson | 307/234 X |
| 3,706,992 | 12/1972 | Brisse et al. | 343/6.8 LC |
| 3,718,926 | 2/1973 | Parker et al. | 343/6.8 LC |
| 3,721,906 | 3/1973 | Geesen et al. | 343/6.5 LC X |
| 3,839,717 | 10/1974 | Paul | 343/6.5 LC |

*Primary Examiner*—Malcolm F. Hubler
*Attorney, Agent, or Firm*—Baldwin, Wight & Brown

[57] ABSTRACT

A circuit arrangement for recognising two pulses in a series by their mutual separation and indicating the time of arrival of one of the pulses comprising a counter gated by the input signals which counts clock signals until a predetermined reference instant in time, a multiple shaft register which stores the binary count when the counter is inhibited and a serial shift register connected to receive the input signal and having along its length tappings spaced by an interval corresponding to a desired separation between the two input pulses, the tappings being connected to a coincidence gate which provides recognition pulses.

19 Claims, 5 Drawing Figures

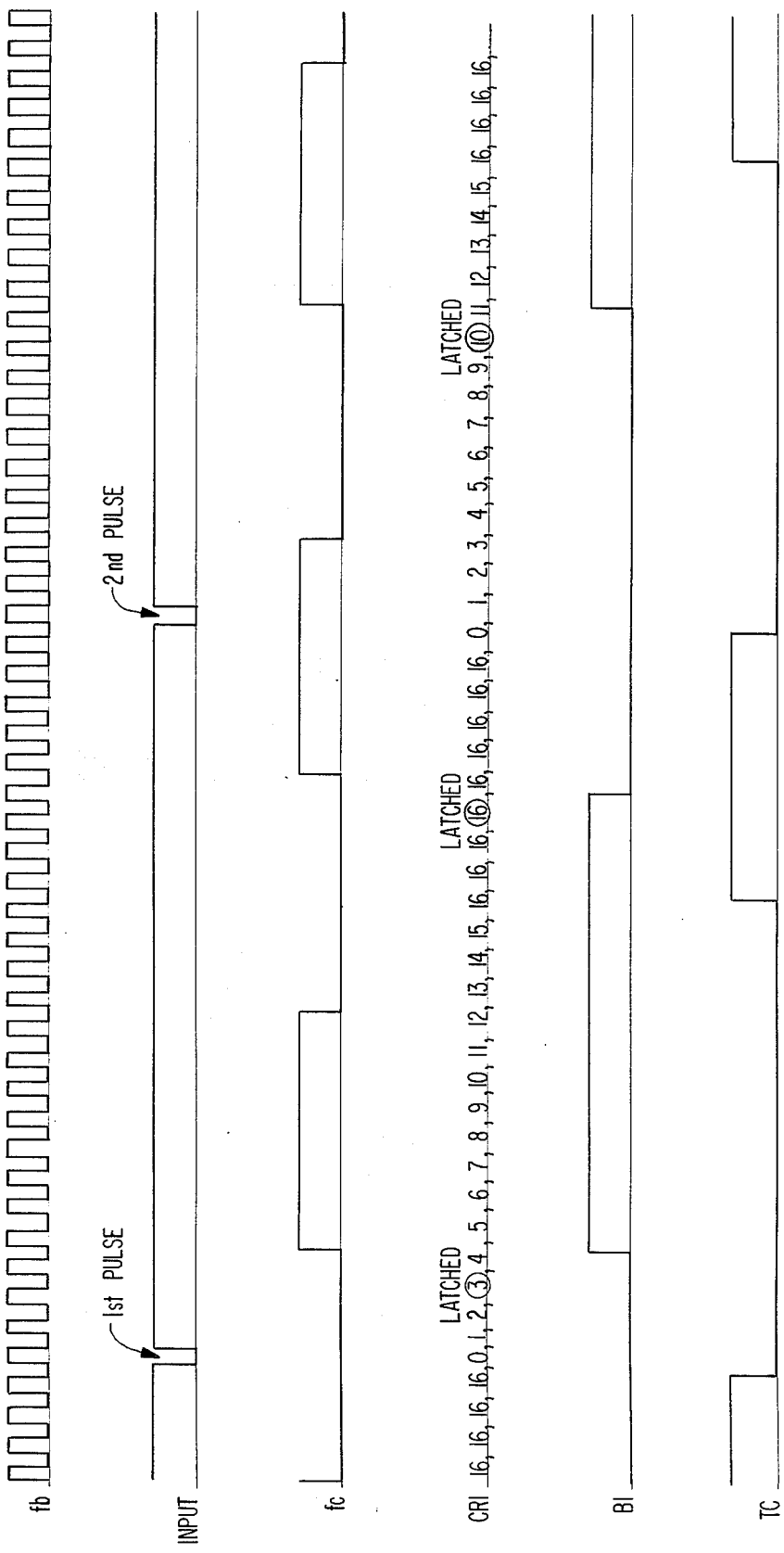

PULSE PAIR RECOGNITION AND RELATIVE TIME OF ARRIVAL CIRCUIT

Cross Reference to Related Application

This is a continuation-in-part of my copending application Ser. No. 543,153, filed Jan. 22, 1975, now abandoned which is a continuation of my application Ser. No. 403,762, filed Oct. 5, 1973, and now abandoned.

BACKGROUND OF THE INVENTION

This invention relates to pulse signal handling arrangements and more particularly to circuit arrangements for recognising two or more pulses in a series by their mutual separations and indicating the time of arrival of one of the pulses in the series with respect to a known reference time. Pulse signal handling circuits such as this are commonly required for use in interrogator/transponder systems in, for example, airborne distance measuring equipment (DME).

This invention relates to a circuit for use in a transponder system for identifying response signals by their mutual separation in time and measuring the time of arrival of one of the pulses in relation to the time of transmission of an interrogation pulse. Such circuits are used in transponder systems for the purpose of airborne distance measurement, the TACAN system being an example of such an application.

In an airborne distance measuring equipment (DME) a transponder (transmitter/responder) aboard an aircraft transmits towards one of a set of navigation beacons on the ground a pair of pulses which are treated by the beacon as an instruction to send in reply two pulses of predetermined separation (after a predetermined time delay required for the purpose of processing). Upon receiving the response signals, the transponder aboard the aircraft first attempts to recognise the true response signals from spurious background signals by the mutual separation of the pulses, and measures the time of arrival of one of the received pulses in relation to the time that the interrogation was transmitted. The timing of arrival of the response is transmitted to a computer which, by subtracting the known processing delays inherent in the system arrives at a time representative of the travel time of radio waves to and from the beacon and by this method the distance of the aircraft from the beacon is calculated.

It is well known to discriminate between pulses of a known separation and spurious pulses by applying all the response pulses to a shift register having multiple tappings spaced apart by a number of stages corresponding to a time separation equal to the separation of the received signals. When a coincidence gating circuit detects the simultaneous presence of a response signal in each of the tapped stages then it is known that the sequence in the shift register is a true reply.

Since the accuracy requirements for distinguishing between true responses and spurious signals are not particularly stringent it is possible to utilise for the purpose of discrimination relatively slow acting shift registers. However, if it is desired to time the arrival of the first pulse in the series with respect to the time that the interrogation pulse was transmitted the coarse time quantisation effected by a shift register would destroy the accurate timing required for the purpose of distance measurement.

BRIEF SUMMARY OF THE INVENTION

It is a primary object of the present invention to provide a circuit which while using only slow acting shift registers, (by which it is meant shift registers capable of discriminating between true responses and spurious signals but not sufficiently fast to allow accurate distance measurement in conventional circuits) enables both pulse discrimination and timing to be effected.

Preferably a single serial shift register and a serial multiple shift register are each controlled to be stepped at the same relatively low or coarse frequency by a clock signal generating means which is itself controlled by a first clock signal generating means having a relatively high or fine frequency output.

The simple serial shift register is employed to constitute means for generating a signal which indicates that the separation in time between first and second response pulses is of the correct value corresponding to the aircraft in question and the multiple shift register is employed to recover the number of fine clock signals occurring between the time of reception of the first pulse and the occurrence of a subsequent coarse clock signal. If this delay is subtracted from the time, measured in coarse clock signals, which has elapsed beginning with the interrogation pulse, a time value from which distance or range can be computed is known.

The generation of the signal which indicates correct separation of pulses involves means for taking signals from the last and from an appropriate intermediate stage in the simple serial shift register to determine coincidence thereof.

Normally said means responsive to the coincidence of signals in said two stages of said shift register comprises an AND gate.

Where it is desirable to permit a degree of tolerance in the spacing of said two pulses which is acceptable, in order for example to take into account pulse jitter, means may be provided for taking output from said appropriate intermediate stage and from stages on either side of said appropriate intermediate stage and apply signals thus obtained to an OR gate, the output terminal of which is connected to the input terminal of said AND gate to which said appropriate intermediate stage alone would otherwise be connected.

The output from said AND gate is applied to inhibit counting of a further binary counting arrangement which is arranged to be triggered at the known reference time, e.g. upon transmission of the interrogating signal, thereby to provide the aforesaid number of coarse clock pulses which have elapsed beginning with the interrogation pulse.

Where there are more than two pulses in said series and it is desired to check that the mutual separations of more than said two pulses is that required, means may be provided for taking output from further appropriate intermediate stages in said serial shift register.

If desired, further multiple shift registers may be provided controlled in the manner in which said first mentioned shift register is controlled to which binary information relating to, for example, the amplitudes of the pulses in the series may be applied.

BRIEF DESCRIPTION OF DRAWING FIGURES

The invention is illustrated in and further described with reference to the accompanying drawings in which:

FIG. 5 is a timing diagram illustrating certain principles of the FIG. 4 system.

DETAILED DESCRIPTION OF THE INVENTION

Figure 1:
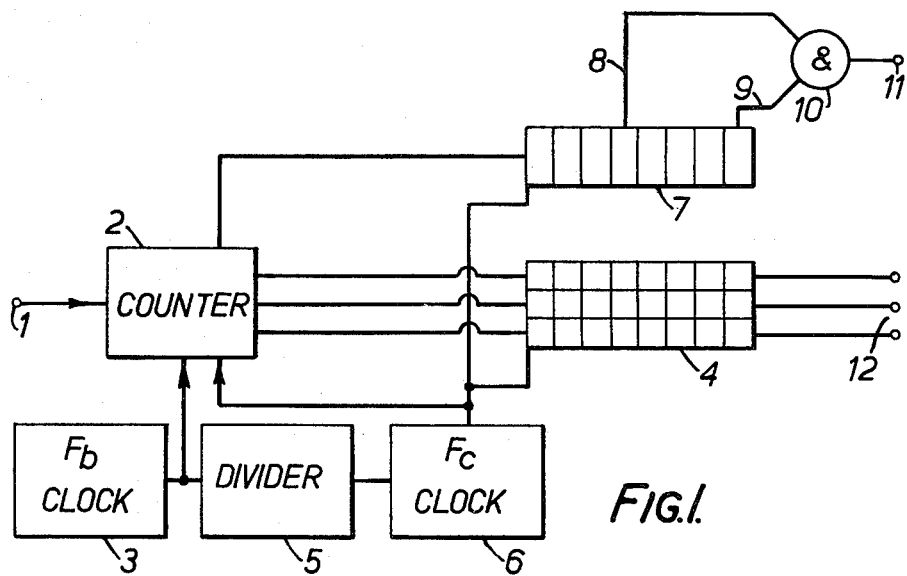
FIG. 1 is a highly schematic diagram of one pulse sequence recognition arrangement in accordance with the present invention.

Referring to FIG. 1, at input 1 is applied a pair of pulses whose mutual separation and time of arrival are to be determined. The pair of pulses may be assumed to be a pair of pulses received by an airborne distance measuring apparatus from a ground station. The mutual separation of the pulses identifies the pulse pair as being intended for the airborne distance measuring equipment in question, while the time of arrival of the pair of pulses is indicative of the distance separating the airborne equipment from the station which transmitted the pair at a known predetermined time. Airborne distance measuring equipments and systems including the same are well known per se and will not be described in greater detail.

Input terminal 1 connected to a binary counter arrangement 2 which is arranged to commence counting upon receipt of the first of the pair of pulses. The rate of counting by binary counter arrangement 2 is relatively high, e.g. 8 MHz, and is controlled by a clock generator 3 operating at this relatively high frequency $F_b$. The output count of counter 2 is applied in parallel fashion to respective inputs of a multiple shift register 4 so that when counter arrangement 2 is caused to provide output to register 4, a binary signal representing the count of counter 2 is entered into the register 4.

Output from clock generator 3 is also applied via a suitable divider 5 to control the counting of a relatively low frequency clock generator 6 operating at a frequency $F_c$ which is substantially lower than the frequency $F_b$. Commonly $F_c$ would be 500 Kc/s. Output from clock generator 6 is connected both to control the stepping of multiple shift register 4 and the stepping of a simple shift register 7 which has a tapped output 8 from an intermediate stage along its length and a tapped output 9 from its final stage. Output from clock generator 6 is also connected to counter arrangement 2 in order to inhibit counting of the counter arrangement 2 and effect the transfer of the count current at that time to the inputs of the multiple shift register 4. As will be appreciated, at the time counting by counter arrangement 2 is inhibited the count attained will be a measure, with an accuracy depending upon the frequency $F_b$, of the time of arrival of the pair of pulses with reference to the frequency $F_c$ of clock generator 6. The output signal of clock generator 6 applied to counter arrangement 2 is not only utilised to transfer the inhibit count to the inputs of multiple shift register 4, but also to apply a single pulse to the input of simple shift register 7. The application of input signals to the registers 4 and 7 is arranged to be subjected to a delay equal to one period of the frequency $F_c$ by means not shown, but assumed to be within counter arrangement 2, to allow for slow acting components requiring a relatively longer "set up" time to be used for the shift registers 4 and 7. The tapped outputs 8 and 9 of shift register 7 are connected to different input terminals of an AND gate 10. The mutual separation of the tapped outputs 8 and 9 correspond to the acceptable separation of the two pulses in the pair of pulses for the particular airborne distance measuring equipment in question.

In operation upon the arrival of the first of the pair of pulses, counter arrangement 2 commences counting with a frequency $F_b$ under the control of clock generator 3. Upon the occurrence of an output signal from clock generator 6 counting by counter arrangement 2 is inhibited. One period of the frequency $F_c$ later the inhibited count of counter arrangement 2, which is a measure of the time of arrival of the pair of pulses relative to the output $F_c$ of clock generator 6, is applied to the inputs of register 4 and at the same time a signal is applied to the input of shift register 7. Registers 4 and 7 are stepped in unison under the control of clock generator 6, until the first of the pair of pulses reaches the last stage of register 7 to provide an output on tapped output 9. If at this time the second of the two pulses has triggered counter 2 and a further signal has been transferred to register 7 (and of course, incidentally register 4) which further signal reaches the intermediate stage of register 7 to which tapped output 8 is connected, at the time the first signal reaches the last stage of register 7 an output signal will appear on tapped output 8 and AND gate 10 will provide an output to output terminal 11 which indicates that the pulses separation of the pair of pulses is that required. At the same time a binary signal will appear at the multiple outputs 12 of register 4 which represents the time of arrival of the first of the pair of pulses.

The output signal appearing at terminal 11 is utilised to inhibit the counting of a further counting arrangement which has been triggered at a predetermined previous time (which may be the time of transmitting the interrogation pulse) and which is controlled as to its counting by the clock generator 6. The time of arrival of the first pulse of the pulse pair is obtained by combining the count of this further counting arrangement with the binary signal appearing on the multiple outputs 12 of register 4 and subtracting the known processing delays.

Figure 2:
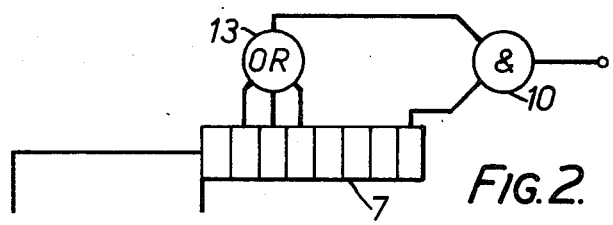
FIGS. 2 and 3 illustrate modifications thereof.

Referring to FIG. 2, the acceptable identifying separation of the pair of pulses is often allowed a certain amount of tolerance at the airborne equipment in order to allow for such effects as pulse jitter. In such a case tapped output may be taken from a number of adjacent stages in register 7, depending upon the tolerance allowed, which tapped outputs are connected to different input terminals of an OR gate 13, the output terminal of which is connected to that input terminal of AND gate 10 to which would otherwise be connected the intermediate tapped output of register 7 alone.

If desired, further multiple shift registers may be provided controlled in the manner in which said first mentioned shift register is controlled to which binary information relating to, for example, the amplitudes of the pulses in the series may be applied.

Figure 3:
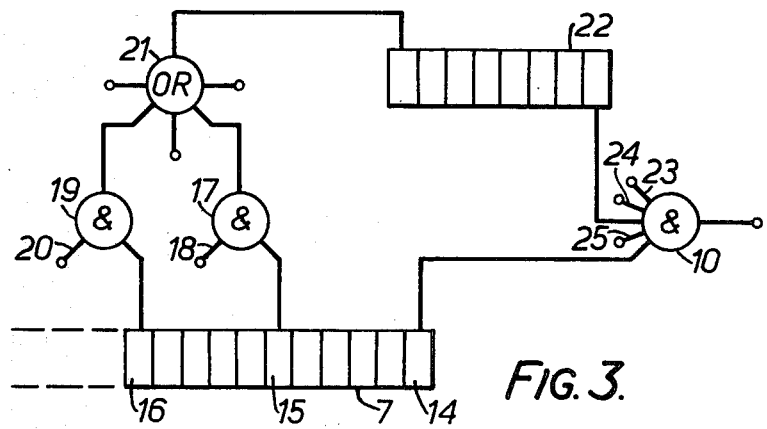

Referring to FIG. 3, the modification illustrated therein may be used where the nominal pulse spacing of the two pulses in the series may differ in value depending upon the operating mode or channel of the overall equipment. In this case output is again taken from the last stage 14 in register 7 and applied, as before, to AND gate 10. Output is also taken from an intermediate stage 15 in register 7 which is spaced from stage 14 in accordance with one of the pulse spacings which is to be recognised. Output is also taken from a further intermediate stage 16 in register 7, the separation between stage 16 and stage 14 corresponding to another pulse spacing which may be required to be recognised by the arrangement. Similarly, outputs may be taken from intermediate stages of the register 7 in correspondence with yet further pulse spacings to be recognised. Intermediate stage 15 is connected to one input of an AND gate 17, a second input 18 to which is derived from a control unit (not shown) when a pulse separation corresponding to the separation between stages 14 and 15 is required to be recognised. Intermediate stage 16 is similarly connected to an AND gate 19 which has a second input 20 derived from said control unit when a pulse separation corresponding to the stages 16 and 14 is required to be recognised. Any further intermediate stages from which outputs are taken are connected to respective gates whose second inputs are correspondingly controlled by the control unit. The outputs of gates 17,19 and any further gates provided in respect of any further intermediate stages from which outputs are taken are connected to different input terminals of an OR gate 21. Output from OR gate 21 is connected to AND gate 10 so that once a gate such as gate 17 and 19 are selectively rendered conductive by the control unit, the arrangement operates in similar fashion to the arrangement already described with reference to FIG. 1. Where pulse jitter is to be taken account of, for each intermediate stage such as 15 and 16 an arrangement as described with reference to FIG. 2 may be used. This, however, results in considerable complication and to avoid this a further simple shift register 22 is introduced between the output of OR gate 21 and AND gate 10. The arrangement of register 22 is such that upon receipt of a signal from OR gate 21 signals are immediately loaded into the final stages of the register. The number of final stages so loaded depends upon the extent of the permitted tolerances in the spacing of the expected pairs of pulses. If a degree of tolerance similar to that assumed in the case of the arrangement shown in FIG. 2 is permitted, the last three stages of register 22 would be loaded. The register 22 is arranged to be stepped in synchronism with registers 7 and 4. For each nominal pulse spacing the intermediate stage of register 7 from which output is taken is that which corresponds to the narrowest pulse spacing within the tolerance allowed. As a signal appears in an intermediate stage, such as 15 whose AND gate, such as 17, is rendered conductive by the control unit a gating waveform will appear at the output of register 22 which embraces the first pulse output from register 7, if the spacing between the two pulses is within tolerance.

As with all of the arrangements herein before described, pulse sequences consisting of more than two pulses may be recognised by the spacings between the pulses by combining in final AND gate 10, output from the final stage of the register 7 and output from appropriate intermediate stage 15. In the case of an arrangement as shown in FIG. 3 registers such as 22 would be provided for each pulse spacing to be recognised and outputs from all of such further registers 22 would be applied as input to AND gate 10. The further registers 22 would be connected to inputs of AND gate 10 such as those represented at 23, 24 and 25.

Figure 4:
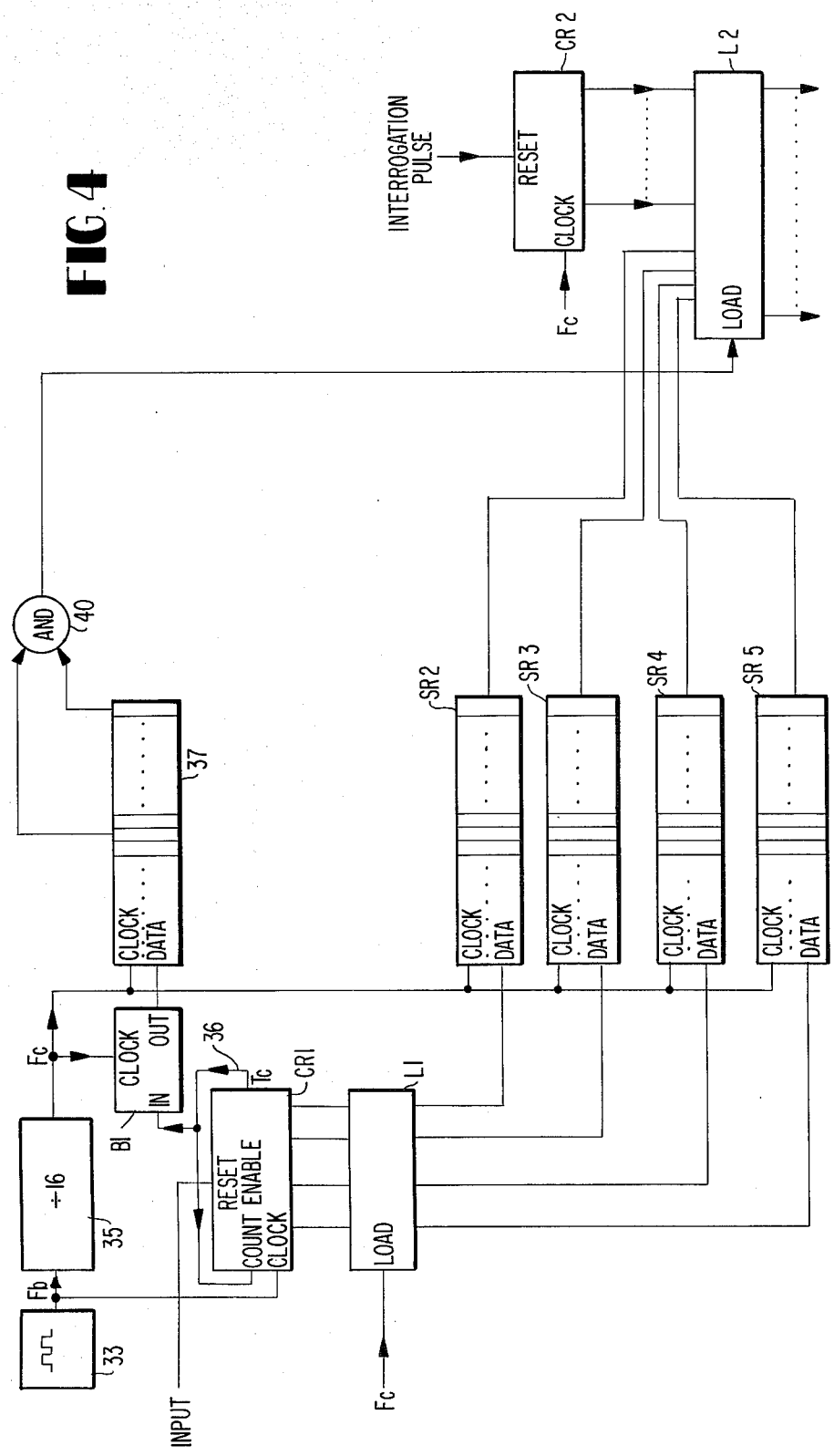
FIG. 4 is a block diagram illustrating a practical embodiment of the invention employing the principles described in conjunction with FIG. 1.

Referring to FIGS. 4 and 5, an oscillator 33 produces a series of fine pulses of frequency $F_b$. This series of pulses is divided by a factor of 16 in a divider circuit 35 to produce a train of coarse clock pulses of frequency $F_c$. The fine pulses from oscillator 33 are counted in a counter CR1 between the time that an input signal (see FIG. 5) is received on the terminal labelled "Input" and the first subsequent leading edge occurring in the train of clock pulses $F_c$. Each time that an input signal pulse is received, the counter CR1 commences to count clock pulses and stops as soon as it is full whereupon a terminal count TC appears on the lead labelled 36. When the signal TC goes high, it is applied to the "count enable" input of the counter CR1 to prevent further counting until a new input signal is received.

The counter CR1 is full when it receives 16 counts and since the divider circuit 35 has a ratio of 16 there will necessarily be produced a coarse clock pulse $F_c$ during the course of counting. This clock pulse when applied to a latch circuit L1 transfers into the latch circuit the count in the counter CR1 obtaining at that instant and maintains this count until it can be transferred into a set of shift registers SR2 to SR5 upon occurrence of a further coarse clock pulse. The purpose of the latch circuit is to provide a buffer between the rapidly changing count in the counter CR1 and the shift registers SR2 to SR5 which require a relatively long "setting-up" time.

The terminal count TC is further applied to a bistable circuit B1 which also receives coarse clock signals $F_c$ and is so designed that it is set by a leading edge of the clock $F_c$ if at any time in the immediately preceding low period the signal TC went low, and is re-set by a clock $F_c$ leading edge if at any time during the immediately preceding low period of the clock the signal TC went high. Thus, the clock pulse which enables the latch circuit L1 to store the count in the counter also triggers the bistable circuit B1. The next leading edge of a coarse clock pulse $F_c$ transfers the information in latch circuit L1 to the first stage of the shift registers SR2 to SR5 (as before mentioned) and also acts on a shift register 37 whose data input is connected to an output terminal of the bistable B1 so that a signal enters the shift register indicating that a response was received at the input terminal.

Thus, as each input signal arrives a bit is entered in shift register 37 to indicate the arrival and there is entered into the parallel shift registers SR2 to SR5 a count which is indicative of the time of arrival of the input pulse in relation to the repetition cycle of the coarse clock pulses.

With further clock pulses from the coarse clock, the stored data travels through the shift registers accompanied by further data pertaining to each subsequently received input signal. If two signals arrive with the desired separation, indicating that there was a response from the ground beacon, then when the first pulse is in the last stage of the shift register 37, the second pulse will lie in another known stage of the shift register 37. Thus, an AND gate 40 is connected to two stages and when there is generated an output signal indicative of the simultaneous presence of a signal in the two stages of the shift register, then it is known that the first signal is part of a valid reply from the ground beacon. This output signal from the AND gate 40 is applied to a second latch circuit L2 which then reads the contents of the last stages of the shift registers SR2 to SR5 which represent the time of arrival of the first pulse in relation to the coarse clock cycle. To complete the timing information required for measuring the time of arrival of this pulse it must also be known how many clock pulses $F_c$ have elapsed since an interrogation pulse was transmitted. For this reason a second counter CR2 counts the coarse clock pulses $F_c$ from the time that an interrogation pulse is transmitted and the count in this counter CR2 is also frozen in the latch circuit L2 for transmission to a computer in parallel with the data derived from the shift registers SR2 to SR5. The information derived from the counter CR2 represents the number of coarse clock pulses in the interval between interrogation and validation of the response pulse which, when combined with the fine information derived from the counter CR1 makes it possible to compute the accurate time of arrival of the input pulse. After subtracting the delays inherent in the system, both in the processing in the radio beacon and in the receiving section of the transponder it is possible to compute the travel time of the radio waves and hence the distance from the radio beacon.

The techniques described in conjunction with FIGS. 2 and 3 may also be applied to the circuit of FIG. 4.

The timing diagram of FIG. 5 illustrates the basic operation described above. One may consider the signal $F_c$ to be the output of a first clock means while the signal $F_b$ may be considered the output of a second clock means having a much higher frequency. The counter CR1 starts counting at the higher frequency when it receives the first input pulse and the count reached by the time the low frequency or first clock next produces a clock signal $F_c$ is latched. In FIG. 5, this count of "three" is shown circled and this count enters the multiple shift register arrangement and is shifted into the multiple shift register arrangement SR2–SR5 by the clock signal $F_c$. Since the latch L1 is loaded at every clock signal $F_c$, the count of "sixteen" is next latched and this "full count" is shifted into the multiple shift register arrangement so that the sequence "three", "sixteen" is now in this multiple shift register. In accord with the timing diagram, the second pulse then appears and starts the counter CR1 again and, as shown, the count of "ten" is latched upon occurrence of the clock signal $F_c$. Thus, the sequence "three", "sixteen", "ten" will be present in the multiple shift register arrangement SR2–SR5. It will be appreciated of course that the two pulses may be widely separated so that a number of cycles of $F_c$ may occur between them, in which case a number of successive "sixteen" counts will be shifted into the multiple shift register arrangement. The number of these "sixteen" counts will of course correspond to the separation of stages to which the AND gate 40 is connected.

Data is shifted into the shift register 37 every time an input pulse appears, but not otherwise because the signal TC must go low (count initiated) before a signal from the flip-flop or binary B1 will appear. Thus, for the sequence depicted in FIG. 5 (count sequence "three", "sixteen", "ten" in the multiple shift register), the sequence "one", "zero", "one" would be in the shift register 37, considering "one" representative of data and "zero" representative of no data. If the separation is proper, the AND gate 40 responds and actuates the latch L2, at which time the number "three" is in the last stage of the multiple shift register arrangement and is latched by L2. At this time, the latch L2 also latches the count in the counter CR2 which has been counting coarse clock pulses from the time of transmission of the interrogating pulse to the ground beacon.

It will be appreciated that the multiple shift register 4 of FIG. 1 or the registers SR2–SR5 of FIG. 4 constitute storage means which capture the fine clock counts of the counter 2 or CR1 which occur between the receptions of the input pulses and occurrences of those coarse clock pulses known to follow such receptions. The simple shift registers of FIGS. 1 and 4, on the other hand, constitute signal generating means which produce recognizing signals when the time separation between response signal pulses is correct and in each case the response signal occurs in fixed time relation to the aforesaid known coarse clock cycles. In this way, if the output from the last stages of the multiple shift register at the time of occurrence of the recognizing signal corresponds to the fine count data associated with a particular pulse, all the information required to obtain the fine count separation between the time of reception of that pulse and the fixed reference time is available. Thus, if the time separation with respect to the second pulse in FIG. 5 is desired, the "length" of the multiple shift register may be decreased so that the count of "ten" will be available when the recognizing signal occurs. The fixed reference time conveniently is made the interrogation time itself, as in FIG. 4, the counter CR2 simply counting the coarse clock pulses generated between the time of interrogation until the time of occurrence of the recognizing signal. The delay, in units of the coarse clock cycle, between the coarse clock cycle known to follow pulse reception and the time of occurrence of the recognizing signal is of course a function of the number of stages in the simple shift register, counting from the first stage thereof to that stage at which the first pulse must be present in order to generate the recognizing signal. This demonstrates that the connection 9 to the gate 10 in FIG. 1, for example, need not be connected to the last stage of the shift register 7. Likewise, the output from the multiple shift register need not be taken from its last stage or, for that matter, it will be seen that plural outputs could be taken in parallel from those different stages of the multiple shift register whereat fine count data with respect to different pulses are known to reside when the recognizing signal occurs.

The counter CR2 is illustrated as effecting counting of coarse clock pulses from interrogation to the generation of the recognizing signal but it will be appreciated that if interrogation is not synchronized with the coarse clock, the counter CR2 could be clocked to count the fine clock pulses instead.

I claim:

1. A circuit arrangement for recognizing two pulses in a series which are separated in time by an amount equal to a certain number of periods of a selected frequency and for indicating the time of arrival of one of said pulses with reference to a recurrent timing signal occurring at said selected frequency, comprising in combination:

first clock means for producing a recurrent timing signal at said selected frequency;

a serial shift register having a plurality of stages, a data input connection for the first stage, output connections from two stages which are separated by a number of stages which is one less than said certain number of periods, and a shifting input connected to said recurrent timing signal;

means connected to said output connections of said serial shift register for producing a recognizing signal in response to the presence of data simultaneously at said output connections;

a multiple shift register having a series of parallel stages, count data inputs to the first of said parallel stages, count data outputs at the last of said parallel stages, and a shifting input connected to said recurrent timing signal;

second clock means for producing a recurrent output signal at a frequency much higher than said selected frequency; and counter means for providing data input to said serial shift register and count data input to said multiple shift register in response to pulse input thereto, said counter means being connected to said output signal of the second clock means to count at said much higher frequency and having an input connection receiving said two pulses for initiation of counting, said counter means having a data output connected to said serial shift register in response to each of said two pulses and having a plurality of count outputs connected to said multiple shift register, whereby the count initiated by each of said two pulses up to the time of the timing signal next following each such pulse is shifted into said multiple shift register and through its succeeding stages in response to succeeding timing signals while data inputs to said serial shift register correspondingly are shifted into and through said serial shift register.

2. An arrangement as claimed in claim 1 and wherein said means responsive to the coincidence of signals in said two stages of said shift register comprises an AND gate.

3. An arrangement as claimed in claim 2 and including means for taking output from said appropriate intermediate stage and from stages on either side of said appropriate intermediate stage and applying signals thus obtained to an OR gate, the output terminal of which is connected to the input terminal of said AND gate to which said appropriate intermediate stage alone would otherwise be connected.

4. In a transponder system, a circuit for identifying response signals by their mutual separation in time and for measuring the time of arrival of one of the pulses in relation to a transmitted interrogation pulse, the circuit comprising:

first clock means for generating first clock pulses of predetermined frequency, second clock means for generating second clock pulses having a frequency equal to a whole number multiple of the frequency of the first clock pulses, first counting means operative to count second clock pulses under the control of the response signals and the first clock pulses and to produce a count representative of the time of arrival of each response signal in relation to the repetition cycle of the first clock pulses, storage means for storing the counts of the first counting means, a multi-stage shifting register connected to receive as data input signals derived from the response signals and arranged to be stepped by the first clock pulses, coincidence gating means for detecting the simultaneous presence of signals in stages of the shift register spaced from one another by a time corresponding to the mutual separation of the response signals to be identified, second counting means operative to count clock pulses so as to measure the time interval between the transmission of the interrogation pulse and the appearance of a signal at the output of the coincidence gating means, and means for combining the count of the second counting means with the count stored in the storage means in respect of the response signal of which the time of arrival is to be measured.

5. A circuit as claimed in claim 4, in which the first clock means is a divider means connected to the second clock means and arranged to divide the second clock pulses by a whole number.

6. A circuit as claimed in claim 4, in which the storage means is constituted by a set of multi-stage shift registers connected in parallel with one another and all arranged to be stepped by the first clock pulses.

7. A circuit as claimed in claim 4, in which the coincidence gating means is an AND gate having a plurality of inputs connected to different stages of the shift register.

8. A circuit as claimed in claim 7, in which an input of the AND gate is connected by way of an OR gate to a plurality of adjacent stages of the shift register.

9. A circuit as claimed in claim 7, in which one input of the AND gate is connected to the output of an OR gate having a plurality of inputs each connected by way of a respective AND gate to a different stage of the shift register, the latter AND gates being operative to receive as further input signals control signals by means of which the desired spacing between pulses to be identified may be selectively adjusted.

10. A circuit as claimed in claim 9, in which there is interposed between the first mentioned AND gate and the OR gate, a shift register operative to be stepped by the coarse clock pulses and connected so as to produce a plurality of output pulses for each received input pulse.

11. In a circuit arrangement for recognizing two pulses in a series which are separated in time by an amount equal to a certain number of periods of a selected coarse frequency and for determining the time of arrival of one of said pulses with respect to a known reference time in units of a recurrent timing signal occurring at a fine frequency which is much greater than said selected frequency, in combination:

first clock means for producing a recurrent timing signal at said fine frequency;

second clock means for producing a recurrent output signal at said coarse frequency;

signal generating means for producing a recognizing signal in response to a time separation between said pulses corresponding to said certain number of periods of said second clock means, the occurrence of said recognizing signal being in fixed time relation to a known cycle of said second clock means;

a multiple shift register having a series of parallel stages, count data inputs to the first of said parallel stages, count data outputs at the last of said parallel stages, and a shifting input connected to said output signal of the second clock means;

counter means for providing data input to said signal generating means and count data input to said multiple shift register in response to pulse input thereto, said counter means being connected to said output signal of the first clock means to count at said selected frequency and having an input connection receiving said two pulses for initiation of counting, said counter means having a data output connected to said signal generating means and having a plurality of count outputs connected to said multiple shift register;

said multiple shift register having a number of stages such that the count data corresponding to all of said pulses is present in the last of said parallel stages when said recognizing signal is generated.

12. In an arrangement as defined in claim 11 wherein said signal generating means comprises a serial shift register having a plurality of stages, a data input connection for the first stage, output connection from two stages which are separated by a number of stages corresponding to said predetermined number of periods of said second clock means, and a shifting input connected to said output signal of the second clock means, and means connected to said output connections of said serial shift register for producing said recognizing signal in response to the presence of data simultaneously at said output connections.

13. An arrangement as claimed in claim 12 and wherein said means responsive to the coincidence of signals in said two stages of said shift register comprises an AND gate.

14. In an arrangement as claimed in claim 13 and including means for taking output from an appropriate intermediate stage and from stages on either side of said appropriate intermediate stage of said serial shift register and applying signals thus obtained to an OR gate, the output terminal of which is connected to the input terminal of said AND gate to which said appropriate intermediate stage alone would otherwise be connected.

15. In a range computing system aboard an aircraft, in combination:
   clock means for generating fine clock pulses of a high frequency and coarse clock pulses of a low frequency, the frequency of said coarse clock pulses being a whole number division of the frequency of said fine clock pulses and being synchronized therewith;
   an input terminal for receiving pulse pairs transmitted by a ground beacon in response to interrogation by the aircraft;
   counter means connected to said input terminal and to said fine clock pulses for counting fine clock pulses subsequent to reception of each pulse of said pair;
   storage means connected to said counter means and to said coarse clock pulses for capturing the count of said counter means when known cycles of said coarse clock pulses occur;
   signal generating means connected to said counter means and to said coarse clock pulses for producing a recognizing signal in response to a predetermined time separation between the pulses of said pair which corresponds to the aircraft, the occurrence of said recognizing signal being in fixed time relation to said known cycles of said coarse clock pulses;
   a second counter means connected to said coarse clock pulses for counting coarse clock pulses subsequent to interrogation; and
   latch means connected to said storage means and to said second counter means for recovering the count from said storage means which corresponds to one of the pulses of said pair and for capturing the count of said second counter means when said recognizing signal occurs, whereby the time delay between interrogation and the reception of said one pulse of said pair may be determined.

16. In a range computing system as defined in claim 15 wherein said storage means comprises a set of multistage shift registers connected in parallel and stepped by said coarse clock pulses.

17. In a range computing system as defined in claim 16 wherein said signal generating means comprises a simple multi-stage shift register, and gating means connected to separate stages of said simple shift register.

18. In a transponder system aboard an aircraft, in combination:
   clock means for generating fine clock pulses and coarse clock pulses, the coarse clock pulses being synchronized with the fine clock pulses and occurring at a frequency much less than the frequency of said fine clock pulses;
   an input terminal receiving a pair of response pulses transmitted by a ground beacon in response to interrogation by the aircraft;
   signal generating means for recognizing a particular time separation between said pair of response pulses and for generating a recognizing signal in response thereto, said signal generating means being driven by said coarse clock pulses whereby an unknown time delay occurs between response pulse reception and input to said signal generating means whereas a predetermined time delay occurs between input to said signal generating means and generation of said recognizing signal; and
   means for determining said unknown time delay comprising counter means connected to said input terminal and to said fine clock pulses for counting fine clock pulses beginning at each response pulse reception and storage means connected to said coarse clock pulses for capturing the count of said counter means in synchronism with said coarse clock pulses, the captured count associated with one of said response pulses being available at the time of generation of said recognizing signal.

19. In a transponder system as defined in claim 18 wherein said storage means comprises a set of parallel multiple-stage shift registers clocked by said coarse clock pulses, the number of stages of said shift registers being such that the captured count associated with one of said response pulses is at the last stage thereof when said recognizing signal is generated.

* * * * *